(12) United States Patent
Fleming

(10) Patent No.: US 6,933,933 B2
(45) Date of Patent: Aug. 23, 2005

(54) PEN CARTRIDGE THAT TRANSMITS ACCELERATION SIGNAL FOR RECREATING HANDWRITTEN SIGNATURES AND COMMUNICATIONS

(75) Inventor: Paul D. Fleming, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 509 days.

(21) Appl. No.: 09/968,828

(22) Filed: Oct. 2, 2001

(65) Prior Publication Data

US 2003/0063045 A1 Apr. 3, 2003

(51) Int. Cl.$^7$ .............................................. G09G 5/00
(52) U.S. Cl. ..................... 345/179; 345/182; 178/18.01
(58) Field of Search ...................... 345/156, 158, 345/162–164, 172, 179, 180–183; 178/18.01–18.09, 19.01–20.01; 401/28, 45

(56) References Cited

U.S. PATENT DOCUMENTS

| | | | | |
|---|---|---|---|---|
| 3,571,708 A | * | 3/1971 | Hurt ............................. | 324/133 |
| 4,077,807 A | * | 3/1978 | Kramer et al. ............ | 106/31.28 |
| 5,501,535 A | * | 3/1996 | Hastings et al. ............... | 400/88 |
| 5,726,480 A | | 3/1998 | Pister ......................... | 257/415 |
| 5,780,742 A | * | 7/1998 | Burns et al. .............. | 73/514.29 |
| 6,000,287 A | | 12/1999 | Menzel .................... | 73/514.32 |
| 6,088,194 A | | 7/2000 | Imaino et al. .............. | 360/106 |
| 6,197,610 B1 | | 3/2001 | Toda ........................... | 438/50 |
| 6,199,874 B1 | | 3/2001 | Galvin et al. ............ | 280/5.514 |
| 6,235,550 B1 | | 5/2001 | Chan et al. .................... | 438/52 |
| 6,249,219 B1 | | 6/2001 | Perez et al. ................. | 340/467 |
| 6,249,274 B1 | | 6/2001 | Svancarek et al. .......... | 345/158 |
| 6,257,062 B1 | | 7/2001 | Rich ....................... | 73/514.32 |
| 6,474,888 B1 | * | 11/2002 | Lapstun et al. ............... | 401/45 |
| 6,627,870 B1 | * | 9/2003 | Lapstun et al. ............. | 250/221 |

FOREIGN PATENT DOCUMENTS

| | | | | |
|---|---|---|---|---|
| WO | | 99/22338 | 5/1999 | ........... G06K/11/18 |
| WO | WO 99/22338 | | * 5/1999 | ........... G06K/11/18 |

* cited by examiner

*Primary Examiner*—Bipin Shalwala
*Assistant Examiner*—Mansour Said
(74) *Attorney, Agent, or Firm*—Allen, Dyer, Doppelt, Milbrath & Gilchrist, P.A.

(57) ABSTRACT

An ink cartridge for a pen includes a cartridge having a writing tip. An ink reservoir is contained within the ink cartridge and communicates with the writing tip for allowing ink transfer from the ink reservoir through the writing tip. A microelectromechanical (MEMS) accelerometer sensor is mounted within the cartridge in a position for generating an acceleration signal indicative of movement of the writing tip. A transmitter is operatively connected to the microelectromechanical (MEMS) accelerometer sensor and receives any acceleration signals generated from the microelectromechanical (MEMS) accelerometer sensor and transmits any acceleration signals to a remote processor, such as a Personal Digital Assistant (PDA) or a personal computer where any acceleration signals are processed for recreating handwritten signals and communications.

61 Claims, 3 Drawing Sheets

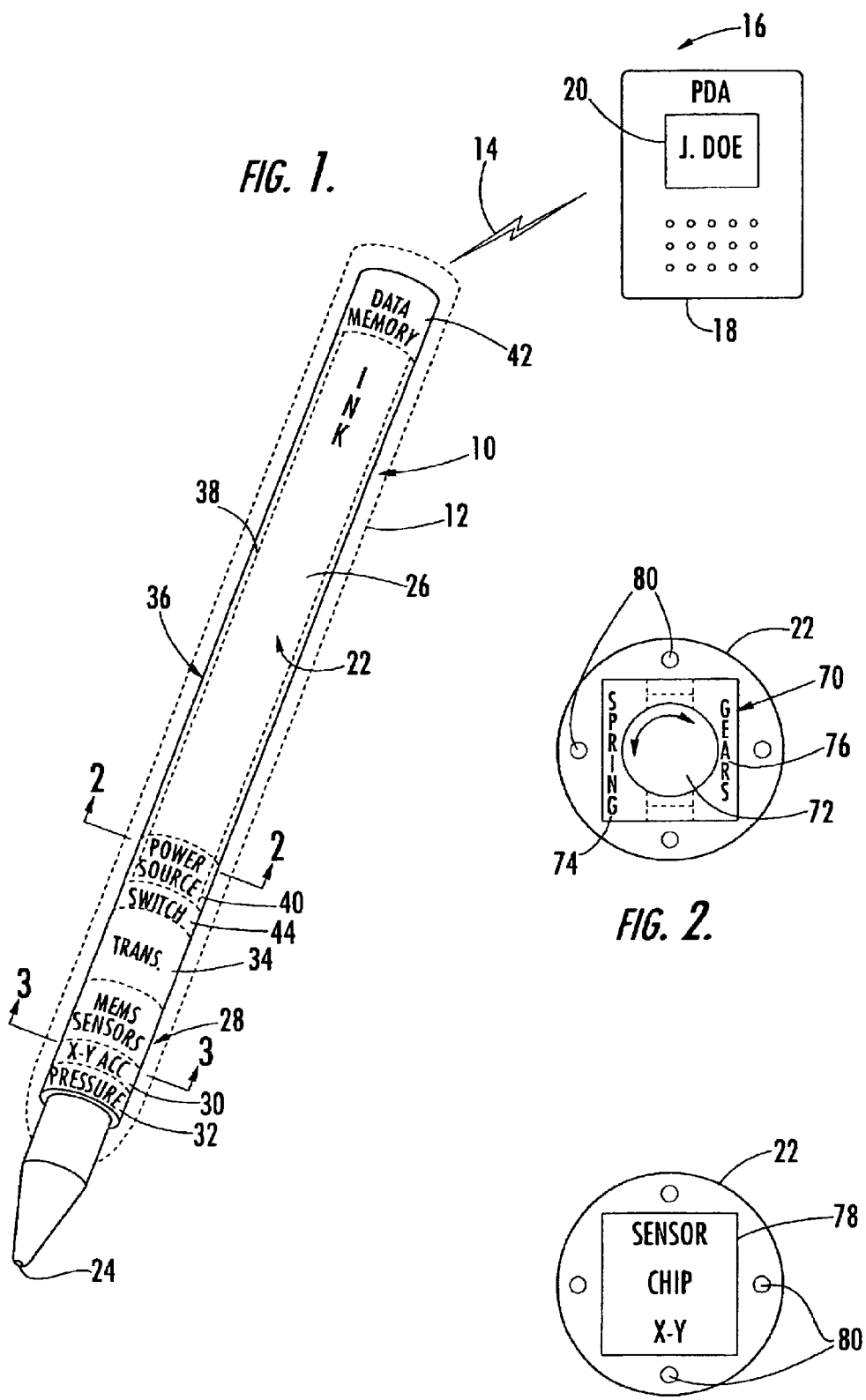

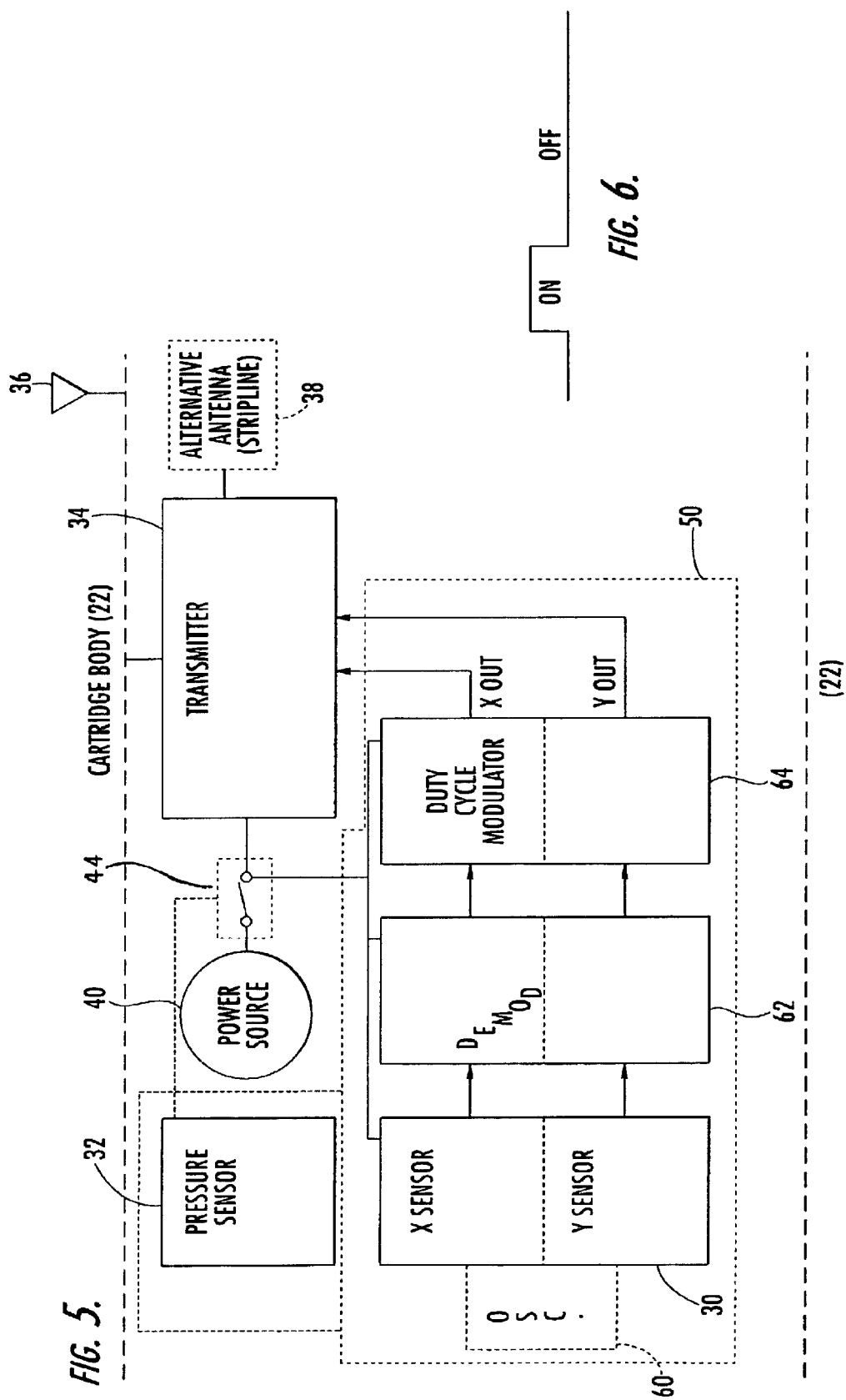

PEN CARTRIDGE THAT TRANSMITS ACCELERATION SIGNAL FOR RECREATING HANDWRITTEN SIGNATURES AND COMMUNICATIONS

FIELD OF THE INVENTION

This invention relates to hand-held input devices, and more particularly, this invention relates to an input device such as a pen that detects movement for determining signatures and handwritten communications.

BACKGROUND OF THE INVENTION

Many palm-top personal computers and Personal Digital Assistants (PDA) use a small pen or stylus that works in conjunction with the palm-top personal computer or PDA screen. A user inputs data by pressing the stylus or pen against the screen. The processor contained in the palm-top personal computer or PDA responds to stylus or pen movement as an input signal and processes any input data to recreate handwritten signatures and communications, open menus, or input other data.

In an advance over some of the Personal Digital Assistants and palm-top computers, Published International Application PCT/GB98/03016 discloses a portable computer that is configured to be hand held, functions as a pen, and includes a small display screen. Accelerometers are positioned near the writing tip at the base of the hand-held computer pen and detect movement of the computer as a pen with respect to gravity to provide input into a microcontroller and select from a number of viewing modes a proper response. Personal Digital Assistant and palm-top computer functionalities are incorporated into the large plastics casing that acts as a pen, including the functions of a calendar, contacts, scrolling, voice, e-mail, diary, data entry, calculator, and other functions, as is typical with many commercially available Personal Digital Assistants. An accelerator detector is incorporated into this portable computer pen and detects x and y movement components at a 90° angle. This hand-held computer pen can include a sound input device for recording voice messages. An infrared transceiver can be mounted at the front of the casing to allow any data that has been processed to be transferred to a lap-top or other computer for storage or subsequent processing.

In this sophisticated hand-held computer pen, the microcontroller or processor contained in this device uses the output from the accelerometers to determine what different views should be displayed on the screen. This creates a virtual hinge. When a user moves the stylus while it is in the viewing position, the screen information can be changed to respond to any natural reaction, such as for looking up or down or to the left or right. For example, if the screen is designated a current page, then if the stylus or pen is tilted toward the left, the accelerometers would determine the change in position and cause the display of the page to move to the right of the current page.

It is possible also that through a process of auto-correlation from the processor within the pen, data received from the accelerometers can determine what characters had been entered. With sophisticated programming contained within the hand-held computer pen, some cursor movement and passwords and signatures can be processed.

Although the hand-held computer pen as described provides functionality for character analysis, all functions are contained within a large, hand-held unit, which is cumbersome. It would be more advantageous if a standard pen could have some functionality for determining movement of its writing tip without the necessity of having on-board processing capability that would demand volume space as in the invention described above. It would be even more advantageous if an ink cartridge alone could have such functionality, allowing it to be inserted within many different types of pen bodies.

SUMMARY OF THE INVENTION

The present invention is advantageous and overcomes the disadvantages of the prior art that uses large, hand-held computer pens having on-board accelerometers and processors for determining character analysis, handwriting and other functions, such as described above.

The present invention provides an ink cartridge for a pen where an acceleration signal is produced by accelerometers and is transmitted to a remote processor or stored for later retrieval and remote processing to recreate handwritten signatures and communications. Thus, a small, hand-held pen that is typically used by millions throughout the world can now have character analysis functionality when used in conjunction with a remote processor having the appropriate software to process the acceleration signals obtained from the cartridge for recreating handwritten signatures and communications.

In one aspect of the present invention, an ink cartridge for a pen includes a cartridge having a writing tip. An ink reservoir is contained within the cartridge and communicates with the writing tip for allowing ink transfer from the ink reservoir through the writing tip. A microelectromechanical (MEMS) accelerometer sensor is mounted within the cartridge in a position for generating an acceleration signal indicative of movement of the writing tip. A transmitter is operatively connected to the microelectromechanical (MEMS) accelerometer sensor and receives the acceleration signal from the microelectromechanical (MEMS) accelerometer sensor and transmits this acceleration signal to a remote processor, such as a lap-top computer, or other computer, where the acceleration signal is processed for recreating handwritten signatures and communications.

In one aspect of the present invention, a power source is contained within the cartridge and operatively connected to the microelectromechanical (MEMS) accelerometer sensor and preferably also the transmitter for powering the accelerometer sensor and transmitter. The power source in one aspect of the invention could be a battery, and in another aspect of the invention the power source could be a self-powering mechanical movement device that generates power for movement of the cartridge in a manner similar to some self-winding watches.

In another aspect of the present invention, an antenna is positioned along the cartridge and operatively connected to the transmitter through which acceleration signals are emitted. This would be advantageous such as with a translucent or clear ink cartridge made from a plastic material as is often commercially used. In another aspect of the present invention, the cartridge itself acts as an antenna for the acceleration signals and can be formed from a metallic or other material that is operative as an antenna material.

In yet another aspect of the present invention, the microelectromechanical (MEMS) accelerometer sensor is a dual-axis MEMS accelerator sensor. It is operative for producing an acceleration signal to the transmitter having a duty cycle that is proportional to the acceleration. This acceleration signal could comprise a digital PWM output signal. It could also comprise an analog output signal in yet another aspect of the present invention.

The microelectromechanical (MEMS) accelerometer sensor could be formed as one or more movable beam members and differential capacitors that are reactive to beam movement for producing an output voltage having an amplitude proportional to displacement of the beam member. A demodulating/modulator circuit receives the output voltage and converts the output voltage to a Pulse Width Modulated (PWM) signal as an acceleration signal. The movable MEMS beam members and other circuits, such as the demodulator/modulator circuit, can be monolithically formed on one chip by techniques known to those skilled in the art, using standard MEMS and integrated circuit manufacturing techniques.

In yet another aspect of the present invention, the ink cartridge can be formed to have a data storage, i.e., semiconductor memory, which is operatively connected to the microelectromechanical (MEMS) accelerometer sensor for receiving any acceleration signals and storing data regarding the acceleration signals for later retrieval and processing at a remote processor to recreate handwritten signatures and communications. This data storage could be a small semiconductor memory unit that stores acceleration signals, which can be entered into the remote processor at a later time for determining any past communications by the pen.

In yet another aspect of the present invention, a pressure sensor is mounted within the cartridge for determining when the cartridge is in use for writing. A switch is operatively connected to the microelectromechanical (MEMS) accelerometer sensor and switches off power to the accelerometer sensor when the ink cartridge is not in use and writing. In this manner, any power generated by the power source, especially when a battery is the power source, is not used and saved unless the ink cartridge is actually in use. This power source and switch can also be operatively connected to the transmitter.

BRIEF DESCRIPTION OF THE DRAWINGS

Other objects, features and advantages of the present invention will become apparent from the detailed description of the invention which follows, when considered in light of the accompanying drawings in which:

FIG. 1 is a fragmentary, isometric view of the ink cartridge of the present invention contained in a pen, and showing basic elements of the MEMS sensors, transmitter, power source, ink reservoir, memory or data storage, and PDA as a remote processor for processing acceleration signals received from the ink cartridge and determining hard-written signatures and communications.

FIG. 2 is a fragmentary view taken along line 2—2 of FIG. 1, and showing a basic layout of the ink channels that connect to the ink reservoir, and a self-powering mechanical movement device that generates power based on movement of the cartridge.

FIG. 3 is a fragmentary, sectional view taken generally along line 3—3 of FIG. 1, and showing the ink channels that connect to the ink reservoir, and the location of a sensor chip having the microelectromechanical (MEMS) accelerometer sensor and pressure sensor that can be used with the present invention.

FIG. 5 is a high-level block diagram of a circuit that can be used with the present invention and showing the accelerometer sensor, pressure sensor, power source, transmitter and demodulator/modulator circuit.

FIG. 6 is a graph showing an output duty cycle for an acceleration signal where the length of the "on" portion of the cycle is less than the total cycle.

DETAILED DESCRIPTION OF THE PREFERRED EMBODIMENTS

Figure 4:
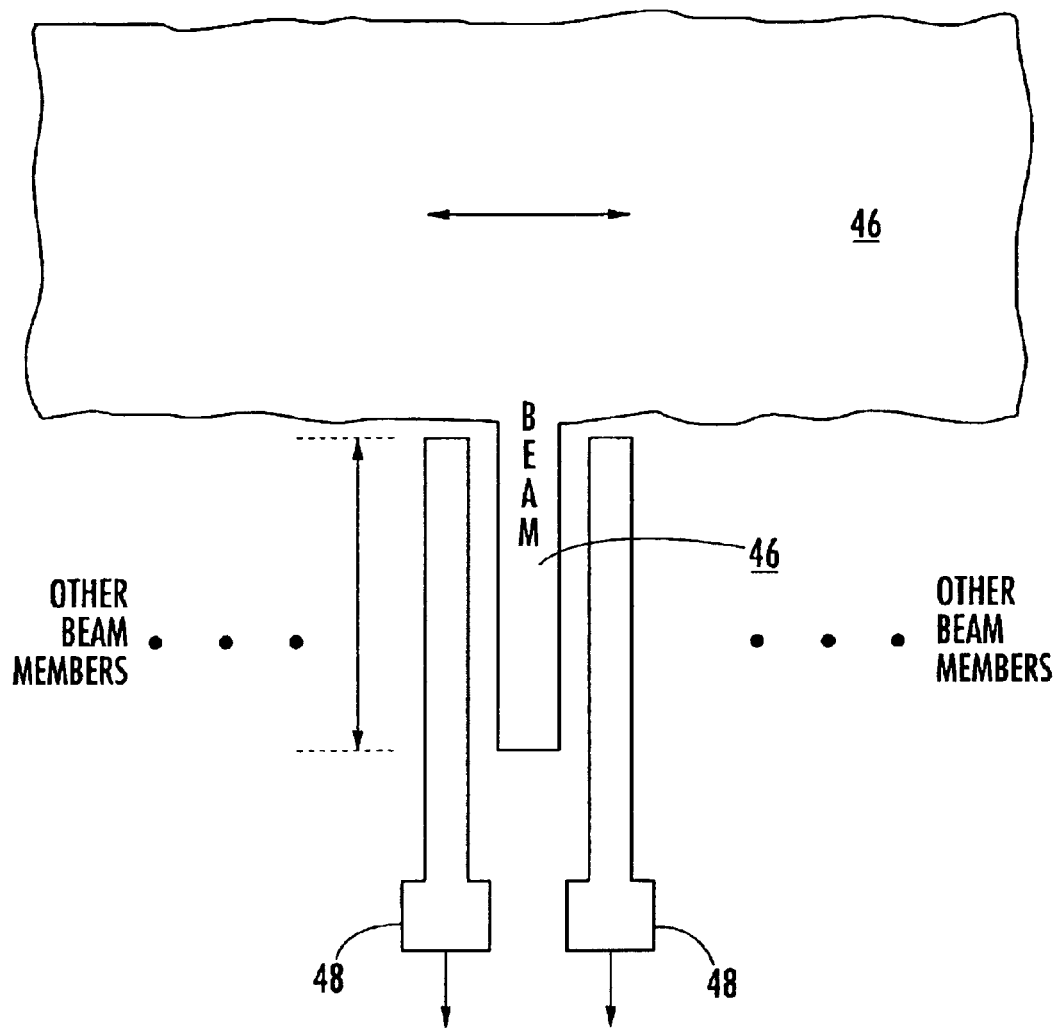
FIG. 4 is a fragmentary plan view of a type of accelerometer sensor using beam members and differential sensors.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and allows a regular pen to have inserted therein an ink cartridge of the present invention that generates an acceleration signal to a remote processor, where the acceleration signal can be processed for recreating handwritten signatures and communications. Because only an acceleration signal that is derived from a microelectromechanical (MEMS) accelerometer sensor is generated, the more sophisticated electronic circuitry and processing chips associated with many prior art computer pen devices is not contained within the ink cartridge, and a much smaller device can be formed. In another aspect of the present invention, the acceleration signals as generated by the microelectromechanical (MEMS) accelerometer sensor are stored in a separate data storage or semiconductor memory as part of the ink cartridge. This data can be later retrieved and processed at a remote computer to determine any past handwritten signatures and communications. Because all functionality for generating the acceleration signal is contained within an ink cartridge, many different styles and types of pen bodies can be used to receive the ink cartridge. This is advantageous over prior art devices having all functionality, including on-board processing and data display as described above. In the present invention, the ink cartridge itself could be an antenna, or a separate stripline or other means, and contained within the ink cartridge through which the acceleration signal is transmitted.

Referring now to FIG. 1, there is shown as a non-limiting example an ink cartridge 10 of the present invention, contained within a pen body of a pen, indicated by the dashed lines 12 in FIG. 1. An acceleration signal 14 has been transmitted by the ink cartridge 10 to a remote processor 16, which in this illustrated embodiment is a Personal Digital Assistant 18 (PDA), where the acceleration signal is processed and the handwritten signatures and communications are recreated on the LCD screen 20 of the Personal Digital Assistant.

As is typical with most ink cartridges, the illustrated ink cartridge 10 includes a cartridge body 22 having a writing tip 24. An ink reservoir 26 is contained within the cartridge body 22 and communicates with the writing tip 24 for allowing ink transfer from the ink reservoir through the writing tip. Microelectromechanical (MEMS) sensors 28, including the illustrated accelerometer sensor 30 and pressure sensor 32, are mounted within the lower portion of the ink cartridge adjacent the writing tip 24, as illustrated. The microelectromechanical (MEMS) accelerometer sensor 30 generates an acceleration signal indicative of movement of the writing tip, typically minimally along an x-y axis, although it is possible to indicate the x, y and z axis. A transmitter 34 is operatively connected to the microelectromechanical accelerometer sensor 30 and receives the acceleration signal from the accelerometer sensor and transmits this acceleration signal to a remote processor, such as at the Personal Digital Assistant 18 or other computer, where the signal is further processed for recreating the handwritten signatures and communications.

An antenna 36 used by the transmitter could be the cartridge body 22 itself, such as when the cartridge body is formed of a metallic or other similar material that can be adapted for use as an antenna, or could be a separate stripline 38, as indicated by the dashed line in FIG. 1. Alternatively, the antenna could be a fine wire or other antenna material that is positioned either on the inside surface of the cartridge or the exterior cartridge surface. The power source 40 provides the appropriate voltage and current to the accelerometer sensor 30 and transmitter 34. As illustrated, a data storage 42 could be operatively connected to the microelectromechanical (MEMS) accelerometer sensor 30 and receive the generated acceleration signals and store data regarding the acceleration signals for later retrieval and processing at the remote processor.

The accelerometer sensor in one aspect of the present invention is a dual-axis accelerometer sensor that generates x-y axis signals. It is also possible to use a three-axis acceleration sensor that generates x-y-z axis signals. It has been found, however, that the dual-axis accelerometer sensor requires fewer on-chip processing components and can be manufactured in smaller sizes, which is advantageous for small cartridges, such as the small-diameter ink cartridges used in many commercially available pens. The MEMS sensors 28 as shown in FIG. 1 can also include the pressure sensor 32 mounted within the ink cartridge 10 adjacent the writing tip 24 for determining when the cartridge is in use and writing. In another aspect of the present invention, a switch 44 is operatively connected to the accelerometer sensor 20, power source 40, and pressure sensor 32 and switches off power to the accelerometer sensor when the ink cartridge is not in use because pressure signals from the pressure sensor are no longer received. The switch 44 could also be connected to the transmitter 34 and switch-off power to the transmitter when the ink cartridge is not in use. This is operable for saving battery power when the power source is a battery.

For purposes of background, basic functional and operation characteristics of a microelectromechanical (MEMS) accelerometer sensor is explained by a more detailed description of the type of electronic circuitry that can be used in conjunction with the microelectromechanical (MEMS) accelerometer sensor. In one aspect of the invention, it is possible to use an accelerometer that is a simple mass spring type of system manufactured from normal silicon MEMS processing techniques. It is also possible to use a hybrid-sensing device that is a combined metal silicon structure. In any event, both the mass spring systems using silicon MEMS structures or a hybrid-sensing device using a combined metal-silicon structure can be formed to have high-resolution, low-range MEMS accelerometers, with various ranges such as 0.1 to 0.5 g sensing.

In a mass spring system, Hookes' law is applicable, i.e., a spring exhibits a restoring force that is proportional to the amount that it has been stretched or compressed. For example, $F=kx$, where k is a constant of proportionality between the displacement (x) and the force (F). In Newton's law of motion, a force operates on a mass and is accelerated and exhibits a force with magnitude $F=ma$. Any system undergoing an acceleration has a force that causes the mass to compress or expand the spring under a constraint where $F=ma=kx$. Thus, the acceleration (a) causes the mass (m) to be displaced by $(x)=ma/k$. If the displacement of x is determined, then the mass has undergone an acceleration of $a=kx/m$. Thus, acceleration can be determined by measuring the displacement of a mass connected to the spring. This is a single-axis accelerometer. To have multiple axes of acceleration, the system is duplicated along each of the required axes.

Any acceleration is proportional to the amount of displacement of the mass with an ideal spring. Through appropriate circuitry that is formed on a silicon chip, together with the microelectromechanical (MEMS) accelerometer devices, some compensation occurs. As is known, the displacement of the mass can be measured by capacitance using plates in parallel with each other. The capacitance is proportional to the property of the material between the two plates and the spacing between the two plates. This type of MEMS structure is shown in FIG. 4, where a small portion of a microelectromechanical accelerometer sensor is illustrated in a fragmentary plan view, showing a movable beam member 46, such as contained on MEMS tethers or other structures by known silicon MEMS processing techniques.

Differential capacitors 48 react to the beam member 46 movement and produce an output voltage having an amplitude proportional to displacement of the beam member. A larger number of the beam members and differential capacitors are normally positioned in a desired configuration for determining x-y axis acceleration signals for a dual-axis system. In a three-axis system, however, a more-complicated beam member arrangement is devised. An example of this type of MEMS accelerometer system is an accelerometer sensor such as commercially available under the name ADXL202E, as manufactured by Analog Devices, Inc. of Norwood, Mass. Although this is only one non-limiting example, other MEMS accelerometer sensors, including piezoelectric designs, or hybrid silicon/metal designs, could be used as determined by those skilled in the art.

As shown in FIG. 5, a circuit that can be used with the accelerometer sensor is contained on a single, monolithic integrated circuit chip, as shown by the dashed line 50 configuration of FIG. 5. The circuit can use an open-loop acceleration measurement where each axis for the x and y sensor axis generates an analog output voltage having an amplitude proportional to displacement of the beam member as explained before. It is possible that this x and y generated amplitude modulated signal could be forwarded directly to the transmitter 34 and transmitted from the antenna, including the cartridge body as the antenna, or the separate stripline or wire, to the remote processor, such as the illustrated PDA. With a more simple dual-axis system, the monolithic integrated circuit could be formed very small, even for use in small ink cartridges used in ballpoint pens. The accelerometer sensor and associated components could be formed to generate a digital or analog output for transmission.

In yet another aspect of the present invention, an oscillator circuit 60 could be used where the differential capacitors 48 are driven by 180° out-of-phase square waves. Any acceleration deflects the movable beam 46 and unbalances the differential capacitors 48 to have a preferred output square wave whose amplitude is proportional to acceleration. By using phase-sensitive demodulation and an on-chip demodulator 62, the generated acceleration signal can be rectified to determine the direction of the acceleration. The output of a demodulator 62 drives a duty cycle modulator 64 through an appropriate resistor circuit. By using an appropriate capacitance circuit, the signal bandwidth can be chosen with any appropriate filtering desired by one skilled in the art. The resistor circuit can set the period for a complete cycle, as shown for example in FIG. 6. A 0 "g" acceleration could produce about a 50% duty cycle. The acceleration can be determined by measuring the length of the T1 and T2 pulses, where T1 is the length of the "on" portion of the cycle and "T2" is the total length of the cycle. The oscillator circuit 60 provides the appropriate square waves for the x sensor and y sensor. The transmitter 34 could be any type of small monolithically formed semiconductor transmitter circuit as is known to those skilled in the art. It can be a low power transmitter operative for transmitting only a few yards, such as across a room or within a building. The transmitter could possibly be formed on the same monolithic chip as the accelerometer sensor or formed as a separate chip, as shown in FIG. 1 and FIG. 5.

The power source 40 that provides power to the accelerometer sensor and transmitter could be a small battery, as known to those skilled in the art such as a small lithium cell. Alternatively, as shown in FIG. 2, a self-powering mechanical movement device 70 could generate power from movement of the ink cartridge. This type of device would be advantageous because the switch 44 may not be required for switching off power to the accelerometer sensor 30 and transmitter 34 when the ink cartridge is not in use. Only when the ink cartridge is moved, as when communicating or writing a signature, would the power source be operative. When the self-powering mechanical movement device includes a storage battery, operative with the mechanical movement device, then a switch would be desired for switching the battery power off. As shown in FIG. 2, the self-powering mechanical movement device 70 could include a rotating weight member 72 as is known to those skilled in the art and typically used in many self-winding types of watches. It is operable with a spring 74 and gears 76 and can be formed from microelectromechanical (MEMS) technology. Ink channels 80 allow ink to flow from the ink reservoir to the writing tip.

As shown in FIG. 3, when a dual-axis accelerometer sensor 30 is used, any integrated circuit sensor chip 78 and associated substrate on which it is formed could typically be placed in a substantially horizontal position relative to the longitudinal access of the ink cartridge. It can, however, with appropriate design modifications, and with a three-axis sensor system, be placed vertical to enhance ink flow. In the embodiment shown in FIG. 3, in a horizontal configuration, vertical ink channels 80 extend past the sensor chip and the power source and communicate with the ink reservoir.

It is evident that the present invention advantageously allows recreation of handwritten signatures and communications without having to have a more bulky hand-held computer pen or other similar system. The ink cartridge of the present invention can be placed in many different types of pen bodies which can be very advantageous for those users who are particular of the appearance and style of their pen. Some users have their favorite pen bodies that they desire to keep. The present invention allows functionality for determining written communications, without doing away with a favorite pen body. In addition, the ink cartridge can work in real time and forward acceleration signals to a remote processor or store the acceleration signals within the on-board memory or data storage for later retrieval and remote processing.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An ink cartridge for a pen comprising:
a cartridge having a writing tip;
an ink reservoir contained within the cartridge and communicating with the writing tip for allowing ink transfer from the ink reservoir through the writing tip;
a microelectromechanical (MEMS) accelerometer sensor mounted within the cartridge in a position for generating an acceleration signal indicative of movement of said writing tip; and
a transmitter operatively connected to said microelectromechanical (MEMS) accelerometer sensor for receiving the acceleration signal from said microelectromechanical (MEMS) accelerometer sensor and transmitting the acceleration signal to a remote processor where the acceleration signal is processed for recreating handwritten signatures and communications.

2. An ink cartridge according to claim 1 and further comprising a power source contained within said cartridge and operatively connected to said microelectromechanical (MEMS) accelerometer sensor for powering said accelerometer sensor.

3. An ink cartridge according to claim 2 wherein said power source comprises a battery.

4. An ink cartridge according to claim 2 wherein said power source comprises a self-powering mechanical movement device that generates power from movement of said cartridge.

5. An ink cartridge according to claim 1 and further comprising an antenna positioned along said cartridge and operatively connected to said transmitter through which acceleration signals are emitted.

6. An ink cartridge according to claim 1 wherein said microelectromechanical (MEMS) accelerometer sensor comprises a dual-axis accelerometer sensor.

7. An ink cartridge according to claim 1 wherein said microelectromechanical (MEMS) accelerometer sensor is operative for producing an acceleration signal having a duty cycle that is proportional to acceleration.

8. An ink cartridge according to claim 7 wherein said acceleration signal comprises a digital pulse width modulation output signal.

9. An ink cartridge according to claim 7 wherein said acceleration signal comprises an analog output signal.

10. An ink cartridge according to claim 1 wherein said microelectromechanical (MEMS) accelerometer sensor comprises at least one movable beam member and differential capacitors reactive to beam movement for producing an output voltage having an amplitude proportional to displacement of the beam member.

11. An ink cartridge according to claim 10 and further comprising a demodulator/modulator circuit for converting the output voltage to a Pulse Width Modulated (PWM) signal as an acceleration signal.

12. An ink cartridge for a pen comprising:
a cartridge having a writing tip and operative as an antenna;
an ink reservoir contained within the cartridge and communicating with the writing tip for allowing ink transfer from the ink reservoir through the writing tip;

a microelectromechanical (MEMS) accelerometer sensor mounted within the cartridge in a position for generating an acceleration signal indicative of movement of said writing tip; and a transmitter operatively connected to said microelectromechanical (HEMS) accelerometer sensor and said cartridge for receiving the acceleration signal from said microelectromechanical (MEMS) accelerometer sensor and transmitting the acceleration signal from the cartridge as an antenna to a remote processor where the acceleration signal is processed for recreating handwritten signatures and communications.

13. An ink cartridge according to claim 12 wherein said cartridge is formed from a metallic material.

14. An ink cartridge according to claim 12 and further comprising a power source contained within said cartridge and operatively connected to said microelectromechanical (MEMS) accelerometer sensor for powering said accelerometer sensor.

15. An ink cartridge according to claim 14 wherein said power source comprises a battery.

16. An ink cartridge according to claim 14 wherein said power source comprises a self-powering mechanical movement device that generates power from movement of said cartridge.

17. An ink cartridge according to claim 12 wherein said microelectromechanical (MEMS) accelerometer sensor comprises a dual-axis MEMS accelerometer sensor.

18. An ink cartridge according to claim 12 wherein said microelectromechanical (MEMS) accelerometer sensor is operative for producing an acceleration signal having a duty cycle that is proportional to acceleration.

19. An ink cartridge according to claim 18 wherein said acceleration signal comprises a digital pulse width modulation output signal.

20. An ink cartridge according to claim 18 wherein said acceleration signal comprises an analog output signal.

21. An ink cartridge according to claim 12 wherein said microelectromechanical (MEMS) accelerometer sensor comprises at least one movable beam member and differential capacitors reactive to beam member movement for producing a voltage having an amplitude proportional to displacement of the beam member as an acceleration signal.

22. An ink cartridge for a pen comprising:

a cartridge having a writing tip;

an ink reservoir contained within the cartridge and communicating with the writing tip for allowing ink transfer from the ink reservoir through the writing tip;

a microelectromechanical (MEMS) accelerometer sensor mounted within the cartridge in a position for generating an acceleration signal indicative of movement of said writing tip; and a data storage operatively connected to said microelectromechanical (MEMS) accelerometer sensor for receiving the acceleration signal from said microelectromechanical (MEMS) accelerometer sensor and storing data regarding said acceleration signal for later retrieval and processing at a remote processor to recreate handwritten signatures and communications.

23. An ink cartridge according to claim 22 and further comprising a power source contained within said cartridge and operatively connected to said microelectromechanical (MEMS) accelerometer sensor for powering of said accelerometer sensor.

24. An ink cartridge according to claim 23 wherein said power source comprises a battery.

25. An ink cartridge according to claim 23 wherein said power source comprises a self-powering mechanical movement device that generates power from movement of said cartridge.

26. An ink cartridge according to claim 22 wherein said microelectromechanical (MEMS) accelerometer sensor comprises a dual-axis MEMS accelerometer sensor.

27. An ink cartridge according to claim 22 wherein said microelectromechanical (MEMS) accelerometer sensor is operative for producing an accelerator signal to said transmitter having a duty cycle that is proportional to acceleration.

28. An ink cartridge according to claim 27 wherein said accelerator signal comprises a digital pulse width modulation output signal.

29. An ink cartridge according to claim 27 wherein said accelerator signal comprises an analog output signal.

30. An ink cartridge according to claim 22 wherein said microelectromechanical (MEMS) accelerometer sensor comprises at least one movable beam member and differential capacitors reactive to beam movement for producing an output voltage having an amplitude proportional to displacement of the beam member.

31. An ink cartridge according to claim 30 and further comprising a demodulator/modulator circuit for converting the voltage to a Pulse Width Modulated (PWM) signal.

32. An ink cartridge for a pen comprising:

a cartridge having a writing tip;

an ink reservoir contained within the cartridge and communicating with the writing tip for allowing ink transfer from the ink reservoir through the writing tip;

a power source mounted within said cartridge;

a microelectromechanical (MEMS) accelerometer sensor operatively connected to said power source and mounted within the cartridge in a position for generating an acceleration signal indicative of movement of said writing tip;

a transmitter operatively connected to said microelectromechanical (MEMS) accelerometer sensor for receiving the acceleration signal from said microelectromechanical (MEMS) accelerometer sensor and transmitting the acceleration signal to a remote processor where the acceleration signal is processed for recreating handwritten signatures and communications;

a pressure sensor mounted within said cartridge tip for determining when the cartridge is in use and writing; and a switch operatively connected to said microelectromechanical (MEMS) accelerometer sensor, power source, and pressure sensor for switching off power to said accelerometer sensor when said cartridge is not in use and writing.

33. An ink cartridge according to claim 32, wherein said power source and switch are operatively connected to said transmitter.

34. An ink cartridge according to claim 32 wherein said power source comprises a battery.

35. An ink cartridge according to claim 32 wherein said power source comprises a self-powering mechanical movement device that generates power from movement of said cartridge.

36. An ink cartridge according to claim 32 and further comprising an antenna positioned along said cartridge.

37. An ink cartridge according to claim 32 wherein said microelectromechanical (MEMS) accelerometer sensor comprises a dual-axis MEMS accelerometer sensor.

38. An ink cartridge according to claim 32 wherein said microelectromechanical (MEMS) accelerometer sensor is operative for producing an acceleration signal to said transmitter having a duty cycle that is proportional to acceleration.

39. An ink cartridge according to claim 38 wherein said acceleration signal comprises a digital pulse width modulation output signal.

40. An ink cartridge according to claim 38 wherein said acceleration signal comprises an analog output signal.

41. An ink cartridge according to claim 32 wherein said microelectromechanical (MEMS) accelerometer sensor comprises at least one movable beam member and differential capacitors reactive to beam movement for producing an output voltage having an amplitude proportional to displacement of the beam member.

42. An ink cartridge for a pen comprising:
a cartridge having a writing tip and operative as an antenna;
an ink reservoir contained within the cartridge and communicating with the writing tip for allowing ink transfer from the ink reservoir through the writing tip;
a power source mounted within said cartridge;
a microelectromechanical (MEMS) accelerometer sensor operatively connected to said power source and mounted within the cartridge in a position for generating an acceleration signal indicative of movement of said writing tip;
a transmitter operatively connected to said microelectromechanical (MEMS) accelerometer sensor, and cartridge for receiving the acceleration signal from said microelectromechanical (MEMS) accelerometer sensor and transmitting the acceleration signal from the cartridge as an antenna to a processor where the acceleration signal is processed for recreating handwritten signatures and communications;
a pressure sensor mounted within said cartridge for determining when the cartridge is in use and writing; and
a switch operatively connected to said microelectromechanical (MEMS) accelerometer sensor, pressure sensor, and said power source for switching off power to said accelerometer sensor when said cartridge is in use and writing.

43. An ink cartridge according to claim 42, wherein said power source and switch are operatively connected to said transmitter.

44. An ink cartridge according to claim 42 wherein said power source comprises a battery.

45. An ink cartridge according to claim 42 wherein said power source comprises a self-powering mechanical movement device that generates power from movement of said cartridge.

46. An ink cartridge according to claim 42 wherein said microelectromechanical (MEMS) accelerometer sensor comprises a dual-axis accelerometer sensor.

47. An ink cartridge according to claim 42 wherein said microelectromechanical (MEMS) accelerometer sensor is operative for producing an acceleration signal to said transmitter having a duty cycle that is proportional to acceleration.

48. An ink cartridge according to claim 47 wherein said acceleration signal comprises a digital pulse width modulation output signal.

49. An ink cartridge according to claim 47 wherein said acceleration signal comprises an analog output signal.

50. An ink cartridge according to claim 42 wherein said microelectromechanical (MEMS) accelerometer sensor comprises at least one movable beam member and differential capacitors reactive to beam movement for producing a voltage having an amplitude proportional to displacement of the beam member.

51. A pen comprising:
a pen body;
an ink cartridge mounted within the pen body, said ink cartridge comprising:
a cartridge having a writing tip;
an ink reservoir contained within the cartridge and communicating with the writing tip for allowing ink transfer from the ink reservoir through the writing tip;
a microelectromechanical (MEMS) accelerometer sensor mounted within the cartridge in a position for generating an acceleration signal indicative of movement of said writing tip;
a transmitter operatively connected to said microelectromechanical (MEMS) accelerometer sensor for receiving the acceleration signal from said microelectromechanical (MEMS) accelerometer sensor and transmitting the acceleration signal to a remote processor where the acceleration signal is processed for recreating handwritten signatures and communications.

52. An pen according to claim 51 and further comprising a power source contained within said cartridge and operatively connected to said microelectromechanical (MEMS) accelerometer sensor for powering of said accelerometer sensor.

53. A pen according to claim 51, and further comprising a pressure sensor for determining when the writing tip is in use and writing and a switch operatively connected to said pressure sensor and accelerometer sensor for switching off power to said accelerometer sensor when the cartridge is not in use and writing.

54. A pen according to claim 53, wherein said power source comprises a self-powering mechanical movement device that generates power from movement of said cartridge.

55. A pen according to claim 51 and further comprising an antenna positioned along said cartridge and operatively connected to said transmitter.

56. A pen according to claim 51 wherein said microelectromechanical (MEMS) accelerometer sensor comprises a dual-axis MEMS accelerometer sensor.

57. A pen according to claim 51 wherein said microelectromechanical (MEMS) accelerometer sensor is operative for producing an acceleration signal to said transmitter having a duty cycle that is proportional to acceleration.

58. A pen according to claim 57 wherein said acceleration signal comprises a digital pulse width modulation output signal.

59. A pen according to claim 57 wherein said acceleration signal comprises an analog output signal.

60. A pen according to claim 57 and further comprising a demodulator/modulator circuit for converting the voltage output to a Pulse Width Modulated (PWM) signal.

61. A pen according to claim 51 wherein said microelectromechanical (MEMS) accelerometer sensor comprises at least one movable beam member and differential capacitors reactive to beam movement for producing an output voltage having an amplitude proportional to displacement of the beam member.

* * * * *